Jan. 30, 1962 J. B. MACKAY 3,019,353
SUPERCONDUCTOR INFORMATION TRANSFER CIRCUIT
Filed Dec. 22, 1958
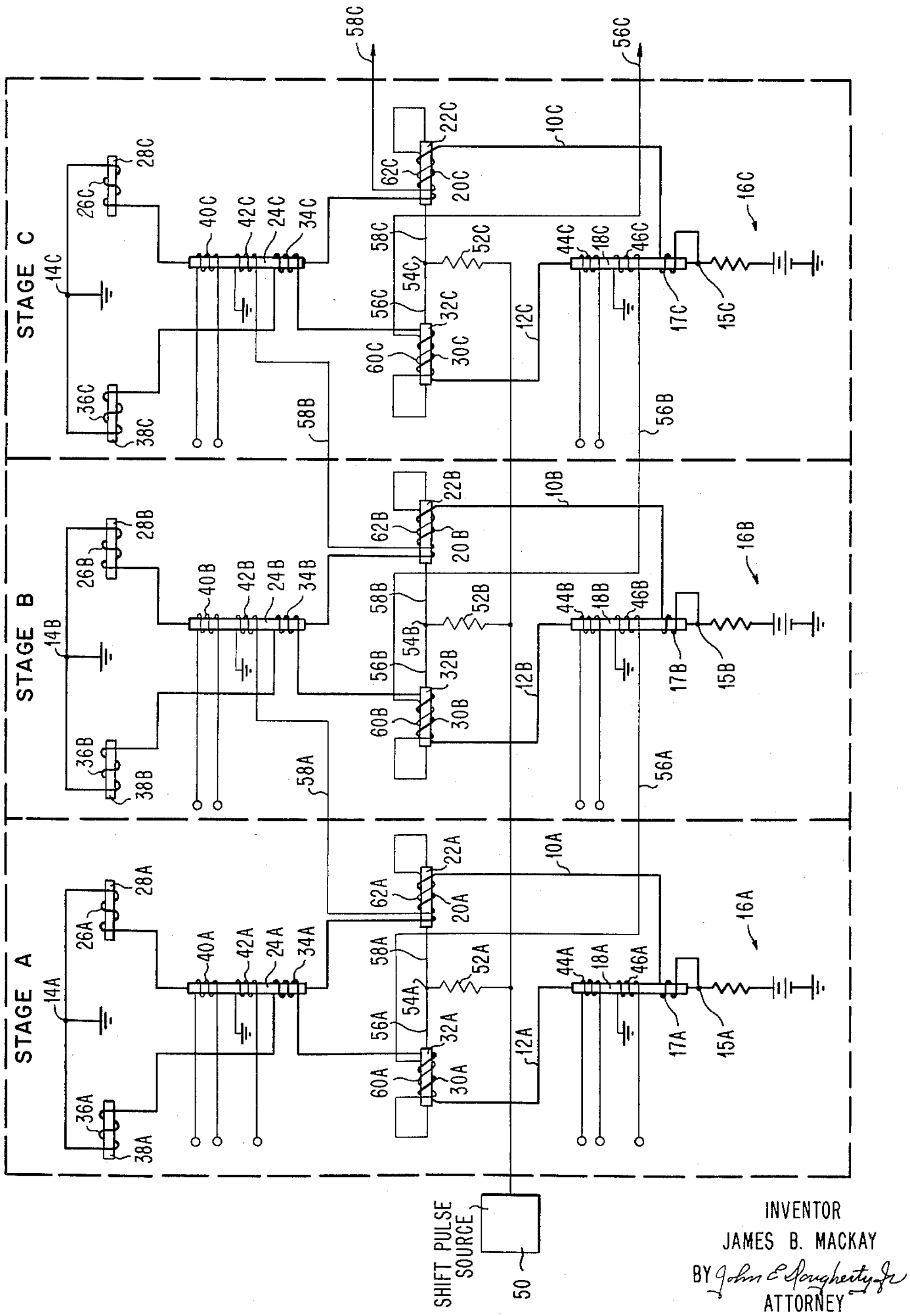
INVENTOR
JAMES B. MACKAY
BY John E. Dougherty Jr.
ATTORNEY 3,019,353

SUPERCONDUCTOR INFORMATION TRANSFER CIRCUIT

James B. Mackay, Poughkeepsie, N.Y., assignor to International Business Machines Corporation, New York, N.Y., a corporation of New York Filed Dec. 22, 1958, Ser. No. 782,310
10 Claims. (Cl. 307—88.5)

The present invention relates to superconductor circuits and more particularly to superconductor information transfer circuits of the shift register type.

Shift register type circuits are, of course, well established as having great utility in a large variety of computer applications. These circuits comprise a number of storage devices connected together by coupling circuits to form a continuous chain and are designed so that an information bit entered in one of the storage devices, or a plurality of bits entered in a group of the storage devices, may be advanced in step by step fashion through the chain in response to a series of shift pulses applied to the circuit. One difficulty encountered in the design of such circuits is due to the fact that it is desirable, when a shift pulse is applied, that each storage device be not only read out to thereby set the next storage device in the register but also be read into under the control of the preceding storage device in the register. In order to avoid difficulties in this regard, shift registers have been designed in the past with a coupling storage device connected between each pair of information storage devices in the chain. In shift registers of this type it has been necessary to employ two alternately applied sets of shift pulses to shift information in the register, one set of shift pulses being applied to the information storage device and the alternate set being applied to the coupling storage devices. Shift registers designed in this way, therefore, require two shift pulses to effect the transfer of information between successive information storage devices and are usually termed double rank shift registers. Single rank shift registers, this is, shift register requiring a single shift to transfer information pulse between successive stages, have been realized by employing storage devices and coupling circuits designed to have specific time constants and controlling the duration of the applied shift pulses. An example of a circuit of this latter type is shown and described in copending application, Serial No. 703,445, filed December 17, 1957, and assigned to the assignee of the subject invention.

In accordance with the principles of the subject invention, a circuit capable of performing shift register and similar information transfer functions is provided which is single rank; which does not require a delay unit between stages; which may be fabricated using superconductor storage devices and coupling circuits having the same time constant; and which does not require that the duration of the applied shift pulses be controlled between close tolerances. These advantages are realized by coupling each pair of the successive storage devices in the circuit with a current steering circuit which is controlled by the preceding coupled storage device each time a shift pulse is applied to set the succeeding storage device, but which is, thereafter, not affected by a change in state of the preceding storage device accomplished before the shift pulse is terminated. Each of these steering circuits includes two current paths connected in parallel with the shift pulse source. These paths are normally under the control of the preceding storage device so that one is resistive and the other superconductive in accordance with the binary state of the preceding storage device. When a shift pulse is applied, the current is directed through the superconductive path to control setting of the succeeding storage device and thereby effect the information transfer. The current paths of the steering circuits are provided with self biasing means which are responsive to a shift pulse in the paths to render the steering circuits non responsive to control by the preceding storage device once the shift pulse has been initially directed into one or the other of the two parallel paths forming the steering circuit. As a result, the state of this preceding storage device may be changed while the shift pulse is applied without in any way affecting the transfer of the bit initially stored to the next succeeding storage device. This self biasing feature in a current steering circuit, per se, is not part of the subject invention, having been shown and described in copending application, Serial No. 704,455, filed December 23, 1957, and assigned to the assignee of the subject invention.

It is an object of the present invention to provide improved superconductor information transfer circuits.

Another object is to provide an improved superconductor shift register.

A further object is to provide a single rank superconductor shift register wherein each of the storage devices is an information storage device and the storage devices, as well as circuits coupling these devices, may be fabricated with superconductor switching devices having the same characteristics and operated with shift pulses which need not be controlled as to their maximum duration.

Still another object is to provide improved information transfer circuitry including a plurality of storage devices with a circuit coupling each preceding storage device to the succeeding device, wherein each coupling circuit is controlled by the coupled preceding storage device when a transfer pulse is initially applied but is thereafter insensitive to a change in state effected in that storage device before the applied transfer pulse is terminated.

These and other objects of the invention will be pointed out in the following description and claims and illustrated in the accompanying drawings, which disclose, by way of example, the principle of the invention and the best mode, which has been contemplated, of applying that principle.

In the drawing:

FIG. 1 is a schematic showing of a three position superconductor shift register constructed in accordance with the principles of the subject invention.

The shift register shown in FIG. 1 includes three stages designated A, B, and C, which are identical in their construction. Each of these stages includes a superconductor storage device in the form of a flip flop circuit capable of assuming either a binary one or a binary zero state. The stages are coupled by current steering circuits which serve to steer shift pulses applied to the circuit so that each stage is set in accordance with the state of the preceding stage at the time a shift pulse is applied. The binary flip flop circuits for the three stages are shown in heavy lines and the steering circuits which couple the stages in lines of normal weight in the interests of providing a more graphic illustration of the circuit. For the same reason each of the superconductor gating devices employed in the flip flop and steering circuits is shown in wire wound form, that is a superconductor gate conductor around which is wound a control coil. Each of the shift register stages including both flip flop and steering circuits is fabricated of superconductor material with the gate conductors being fabricated of a soft superconductor material and the remainder of the circuits is fabricated of a hard superconductor material. These terms are relative, the term soft being used to designate a superconductor material which may be driven resistive by a magnetic field of relatively low intensity at the operating temperature of the circuit and the term hard indicating a superconductor material which requires a magnetic field of relatively high intensity to drive it resistive at the operating temperature of the circuit. With this type of arrangement the hard superconductor portions of the shift register stages remain superconductive throughout, whereas the soft superconductor portions, that is, the gate conductors, are normally in a superconductive state, but are selectively driven resistive by magnetic fields produced by their control coils when energized in a manner that will be explained in detail below. Illustratively, the operating temperature of the circuit may be 4.2° K. and the gate conductors fabricated of tantalum; or the operating temperature may be 3.7° K. in which case the gate conductors would preferably be fabricated of tin. The hard superconductor portions of the circuit may, for example, be fabricated of lead of niobium. Though, as pointed out above, the circuit is here shown in wire form with wire wound cryotron gating devices, in order to present what is believed to be a clearer illustration, the circuit might also be fabricated entirely using thin film conductors and gating devices. For examples of circuits and gating devices of this latter type, reference may be made to copending applications, Serial No. 625,512, and Serial No. 771,085, filed respectively on November 30, 1956, and October 31, 1958, both of which have been assigned to the assignee of the subject invention.

Since the three stages of the shift register shown are essentially identical, corresponding reference numerals are employed to identify corresponding components in each stage with the letters A, B, or C appended to the reference numerals according to the stage. The construction of each of these stages and its mode of operation in the circuit may be understood from the detailed explanation of stage B which is now set forth.

The flip flop circuit for stage B comprises two current paths 10B and 12B. These paths extend in parallel between a ground current terminal 14B and a current input terminal 15B which is connected to a source 16B. Path 10B includes a control coil 17B wound around a cryotron gate 18B, another control coil 20B wound around a cryotron gate 22B, cryotron gate 24B, and another control coil 26B wound around a cryotron gate 28B. The other path 12B includes cryotron gate 18B, a control coil 30B wound around a cryotron gate 32B, another control coil 34B wound around cryotron gate 24B, and still another control coil 36B wound around a cryotron gate 38B. The flip flop is capable of assuming two stable states, in one of which, termed a binary zero state, the current from source 16B is directed through path 10B, and in the other of which, termed a binary one state, the current from source 16B is directed through path 12B. When the flip flop is in its binary zero state, path 10B is entirely superconductive and the current from source 16B flowing in winding 17B maintains a portion of gate 18B resistive. This gate is connected in path 12B and, therefore, this cross coupling ensures that, once the current is established in path 10B, it remains in that path until an input is applied in a manner later to be described. Similarly, winding 34B, which is connected in path 12B, is wound around a portion of gate 24B, which is connected in path 10B, so that this gate is maintained resistive when the flip flop is set in its binary one state with the current from source 16B in path 12B.

The inputs for switching the flip flop between its stable states are applied to one or the other of a pair of input coils 40B and 42B on gate 24B or to one or the other of a pair of input coils 44B and 46B on gate 18B. The three control coils 34B, 40B, and 42B on gate 24B and similarly the three control coils 17B, 44B, and 46B on gate 18B are wound on separate portions of these gates and provide individual rather than combined fields to control the states of these gates. Control coils 40B and 44B serve to apply inputs from circuitry external to the shift register to the flip flop of stage B and are used when, for example, it is desired to simultaneously enter a three bit word into the three position register shown. An input applied to winding 40B is effective to drive the associated portion of gate 24B resistive and thereby cause the flip flop to assume a binary one state. Similarly, an input applied to coil 44B sets the flip flop in its binary zero state. The control coils 42B and 46B are connected in a steering circuit controlled by the flip flop in the preceding or A stage of the shift register and during a shifting operation one or the other of these windings is energized to set the flip flop of stage B into either a binary one or a binary zero state in accordance with the value stored in the flip flop of stage A.

The outputs for the flip flop of stage B of the shift register are provided by the two cryotrons formed by control coil 26B on gate 28B and control coil 36B on gate 38B. When the flip flop is in its binary zero state and the current from source 16B is, therefore, in path 10B, gate 28B is resistive and gate 38B is superconductive. Conversely, when the flip flop is in its binary one state with current in path 12B, gate 28B is superconductive and gate 38B is resistive. These gates, therefore, by their state, superconductive or normal, provide a continuous output indication of the binary information stored in the flip flop and may be sampled without disturbing the state of the flip flop.

The shift pulses for shifting information bits from stage to stage in the register are supplied by a shift pulse source 50. This source is connected through resistors 52A, 52B, and 52C to input terminals 54A, 54B, and 54C for the steering circuits of the A, B, and C stages, respectively, of the shift register. Again referring to stage B as illustrative, the current steering circuit controlled by the flip flop of this stage of the shift register includes two current paths 56B and 58B, which extend in parallel from terminal 54B. Path 56B includes gate 32B, a coil 60B which is connected in series with this gate and wound around the gate, and the control coil 46C on gate 18C in the flip flop of stage C of the shift register. The other path of this steering circuit includes gate 22B, a coil 62B which is connected in series with this gate and wound around the gate, and the control coil 42C on the gate 24C in the flip flop of stage C of the shift register. Gate 24C is connected in the binary zero current path 10C of the flip flop of stage C and, when a shift pulse applied at terminal 54B of the steering circuit of stage B is directed to path 58B and through coil 42C, the flip flop of stage C is set in its binary zero state. Similarly, when the shift pulse applied at terminal 54B is directed to path 56B and through coil 46C on gate 18C, the flip flop of stage C is set in its binary zero state.

The particular one of the paths 56B or 58B into which the shift pulse is directed is determined by the binary state of the flip-flop of stage B as manifested by the state, superconductive or resistive, of gates 22B and 32B. When this flip flop is in its binary zero state with the current from source 16B in path 10B, which path includes coil 20B on gate 22B, gate 22B is resistive and gate 32B is superconductive. When the flip flop of stage B is in its binary one state, gate 22B is superconductive and gate 32B is resistive. Therefore, the shift pulse applied at terminal 54B is directed to path 56B to set the flip flop of stage C in its binary zero state when there is a binary zero stored in stage B of the register and, when there is a binary one stored in stage B, the shift pulse is directed to path 58B to set the flip flop of stage C in its binary one state. The binary bit stored in stage B is, therefore, shifted to the next succeeding stage C each time shift pulse source 50 is actuated. At the same time and by means of similar circuitry the binary bit stored in stage A of the register is transferred to stage B and the bit stored in stage C to either an output circuit for the register or another succeeding stage of the register.

This simultaneous transfer of information with each stage of the register controlling the setting of the next stage and at the same time being set under the control of the previous stage has heretofore presented a rather serious problem in shift registers known in the art. This problem arises when, for example, a particular stage of the register is initially in its binary one state and the previous stage in its binary zero state. In such a case, this particular stage of the register is being shift between its stable states and at the same time is controlling the setting of the next stage in accordance with its initial state. The current steering circuits which couple the stages of the shift register of the subject invention are not subject to any difficulty in this regard.

Again referring to stage B, each of the gates 22B and 32B in the current steering circuit coupling this stage to stage C of the register is provided with a self-winding series connected to the gate and is effective when a shift pulse is directed through the gate to apply a magnetic field to the gate. The magnitude of the shift current pulse and the pitch of the self windings on these gates are such that the field applied by coil 60B or 62B to gate 32B or 22B, as the case may be, is not sufficient of and by itself to drive the gate resistive. Each of these self windings is arranged so that the field it applies combines with the field applied by the other coil on the gate. Thus, coils 20B and 62B apply fields to gate 22B which either add or subtract according to the direction of the current through these windings. Similarly, combined fields produced by coils 30B and 60B are applied to gate 32B. The direction of the currents supplied by shift pulse source 50 and the supply current source 16B are such that the field produced by one of the windings on each of these gates opposes the field produced by the other. Further, the design is such that the current supplied by source 16B in winding 20B or 30B produces a magnetic field sufficient of and by itself to drive the associated gate 22B or 32B resistive. For example, if the field necessary to drive these gates resistive is termed $H_c$, each of the windings 20B and 30B is effective, when energized by current from source 16B, to apply a field of $+1.5H_c$ to its associated gate. Each of the windings 60B and 62B is effective when energized by a current pulse from source 50 to apply a magnetic field of $-.75H_c$ to its associated gate. It therefore becomes evident that when neither or both of the windings on either of these gates are energized, or when only the winding 60B or 62B, as the case may be, is energized, the gate is superconductive. Each of the gates 22B and 32B in the steering circuit coupling stage B to stage C is therefore, maintained resistive only when its associated winding 20B or 30B, which is connected in the flip flop circuit of stage B, is carrying the current from source 16B and there is no current from source 50 in the self winding on this gate.

With this in mind, the operation of the circuit, when a shift pulse is applied by source 50 at a time when stage A is storing a binary zero and stage B is storing a binary one, is now considered. The shift pulse applied at terminal 54B is initially directed through path 58B to set the flip flop of stage C to its binary one state since, with the flip flop of stage B storing a one, gate 22B is superconductive and gate 32B is resistive. Thus, when the shift pulse is initially applied, coil 30B on gate 32B is carrying the entire current from source 16B and is therefore applying a field of $+1.5H_c$ to this gate and there is no current in the self winding 60B on gate 32B so that gate is maintained resistive. Coil 20B in the binary zero current path of the flip flop is not carrying any current and, therefore, the total field initially applied to gate 22B, ignoring the field produced by the current in the gate itself, is the field of $-.75H_c$ applied by coil 62B, and the gate remains superconductive. However, at the same time the shift pulse is applied at terminal 54B of stage B, a similar pulse is applied to terminal 54A of stage A. Since stage A is storing a binary zero, the shift pulse is directed through path 56A of the circuit coupling stages A and B to energize coil 46B on gate 18B in the binary one current path of the flip flop of stage B. The current supplied by source 50 to coil 46B is sufficient to produce a magnetic field in excess of the critical field $H_c$ for the portion of gate 18B around which this coil is wound and the gate is therefore driven resistive. As a result, the current from source 16B begins to shift from path 12B to path 10B and this current shift continues until the entire current from source 16B is in the latter path and the flip flop has been set in its binary zero state.

This shifting of current in the flip flop of stage B does not, however, affect the current in the circuit coupling the stages B and C. Initially, as pointed out above, winding 30B applies a field of $+1.5H_c$ to gate 32B to drive this gate resistive so that the shift pulse is directed through path 58B to set the flip flop of stage C to its binary one state and, at the same time, to energize self winding 62B on gate 22B to apply a field of $-.75H_c$ to this gate. As the current from source 16B shifts from path 12B to path 10B, winding 30B is deenergized and winding 20B is energized. The net field applied to gate 32B is, therefore, reduced to zero, whereas the net field applied to gate 22B is changed from $-.75H_c$ to $+.75H_c$. Thus, as the result of the current shift, gate 32B undergoes a transition from a resistive to a superconductive state but gate 22B remains superconductive. Both of the paths 56B and 58B in the circuit coupling stages B and C are, therefore, superconductive, but the shift current remains entirely in the path 58B in which it was initially flowing since no resistance has been introduced in this path to disturb the current flow therein. When the shift pulse is terminated and there is no longer any current in coil 62B, gate 22B is driven resistive by coil 20B so that the next shift pulse applied is directed through path 56B to set the flip flop of stage C to its binary zero state.

Thus, it can be seen that when a shift pulse is applied at terminal 54B of stage B of the register, the pulse, after an initial transient which has been ignored in the description, is directed by the gates 22B and 32B to one of the paths 56B and 58B and, once in this path, the shift current remains undisturbed even if the state of the flip flop is switched by a shift pulse from the preceding stage of the register. The operation of the other steering circuits coupling the successive stages of the register is the same, each being controlled by one stage to set the next succeeding stage so that each bit in the register is transferred one position to the right.

Referring again to stage B of the register, it can be seen that winding 20B in path 10B is magnetically coupled to winding 62B in path 58B and winding 30B in path 12B is magnetically coupled to winding 60B in path 56B. When, during a shift operation, the current in the flip flop of this stage is shifted between paths 10B and 12B, a current is induced in paths 56B and 58B. These latter paths which extend from terminal 54B to ground actually form a closed loop and, since both of the gates 22B and 32B are superconductive during the latter portion of the shift operation, there is a possibility that the current induced in this loop, due to the coupling between coils 20B and 62B and 30B and 60B, might persist and interfere with subsequent operation of the steering circuit. This possibility may be obviated by connecting another coil in each of the paths 10B and 58B which coils are coupled in a sense opposite to the coupling of coils 22B and 62B and, similarly, another coil in each of the paths 12B and 56B.

It should be noted that though, in the illustrative embodiment shown, a separate supply current source is shown for each stage, the flip flops of the successive stages may be connected in series with a single current source. For example, the sources 16B and 16C may be eliminated, in which case the terminal 14A of stage A is connected to terminal 15B of stage B instead of to ground and, similarly, the terminal 14B is connected to terminal 15C. This shift pulse source 50 may also be connected in series with the steering circuit coupling the successive stages instead of supplying the shift pulses through the parallel connected resistors 52A, 52B, and 52C. The coupling circuits may be connected in series by connecting both of the paths 56A and 58A to terminal 54B instead of ground and, similarly, both of the paths 56B and 58B to terminal 54C instead of ground. With this type of circuit arrangement, the parallel connected resistor connections to the stages are eliminated and a constant current pulse source, which is connected to terminal 54A only, is employed to supply the shift current to the series connected current steering circuits coupling the successive stages of the register.

Regardless of whether the flip flops of the successive stages of the shift register and the current steering circuits coupling these stages are series or parallel connected, the magnitude of the current applied to each of these circuits may be the same. Thus, for example, each of the sources 16A, 16B, and 16C in the embodiment shown may supply the same magnitude of current to terminals 15A, 15B and 15C as is supplied by shift pulse source 50 to terminals 54A, 54B, and 54C. If we term this magnitude of current I, each of the control windings in the circuit, with the exception of the self windings 60A, 62A, 60B, 62B, 60C and 62C may, for example, be effective when carrying this current I to apply to its associated gate a magnetic field equal to $1.5H_c$. Thus, it becomes apparent that each of these gates and control windings may be of identical construction. Stated another way, the circuit may be fabricated entirely with cryotrons having the same characteristics, with each of the steering circuit crytrons, that is, those including gates 32A, 22A, 32B, 22B, 32C, and 22C, having an extra control conductor which, when carrying the current I, applies a magnetic field of $-.75H_c$ to the gate.

The circuit of FIG. 1, as is the case with many shift registers, may be employed as a ring counter wherein a binary one is entered in the first or A stage and then successively stepped from stage to stage. The counter may be closed merely by connecting the steering circuit for the last stage to apply inputs to the first. For example, the paths 56C and 58C of stage C are connected to control coils 46A and 42A, respectively, of stage A to form a closed three stage ring counter circuit. Where an open ring circuit is desired, that is with no connections from the last stage back to the first, path 58A in the steering circuit coupling stages A and B may be connected to coil 46A of stage A instead of to ground. When a shift pulse is applied to terminal 54A with stage A in its binary one state, the pulse is directed through path 58A to set the flip flop of stage B to its binary one state in a manner explained above. When path 58A is connected to coil 46A this shift pulse also serves to reset stage A to its binary zero state. Therefore, when the next shift pulse is applied, the binary one in stage B is shifted to stage C and stage B is reset to its binary zero state under the control of stage A. As a result only a single binary one is stepped down the counter and only one of the stages is in a binary one state after each shift operation. This type of connection is also useful in many shift register applications. For example, in many such applications, it is necessary to enter a multi bit word in parallel in the register and then step or shift that word one or more positions in the register. If the bit entered in stage A, the first stage, is zero, there is, of course, no problem since each stage, beginning with the next lowest order stage B, is reset to zero as the word is shifted to the right. (However, when the bit of the word entered in stage A is a binary one, the above connection resets this stage to its binary zero state during the first shift operation, thereby ensuring that the lower order stages of the register are successively reset to zero as the lowest order of the word entered is shifted to the right. When the shift register is to be used in applications where the bits of information words are to be entered serially in the first stage as well as in parallel to a number of the stages and the above connection from path 58A to coil 46A is provided, a switching device must be also provided to disable this connection circuit during serial entry applications.

As was pointed out above, the information values stored in the various positions of the shift register are manifested by the state of the gates of the output cryotrons; for example, the gates 28B and 38B of stage B. These gates may be sampled between the application of shift pulses to read out the word stored in the register. In many computer applications, shift registers are employed together with logical circuitry in performing various arithmetic operations. In one such application, a multi bit number stored in a shift register is one factor in multiplication to be performed. During this operation, it is necessary to successively read out the bits of the number in parallel from the shift register to the associated logical circuitry; then column shift the bits of the number in the register, and again read out the bits after they have been column shifted. The shift register of the subject invention lends itself readily to such an application since both the read out and column shift operations may be performed simultaneously in response to a shift pulse supplied by source 50. In such an application, the outputs for the various stages of the register are derived from the current steering paths coupling the stages. Thus, paths 56A and 58A, instead of being grounded, are respectively connected to binary zero and binary one output terminals for stage A of the register, paths 56B and 58B and 56C and 58C are similarly connected to binary zero and binary one output terminals for stages B and C of the register. With these connections, it can be seen that each time a shift pulse is applied, a pulse is delivered to the binary one or binary zero output terminal for each stage of the shift register indicatign this binary bit stored in that stage when the shift pulse is applied and, at the same time, the various bits making up the multi bit word are each shifted one position in the register.

Thus, it becomes apparent that the shift register of FIG. 1, constructed in accordance with the principles of the subject invention, may be fabricated with a minimum of circuit components of essentially the same type and is not restricted in operation by closely confining circuit parameters. Further, though exhibiting this simplicity of fabrication and operation, the shift register is extremely flexible and lends itself to a great variety of computer applications. Particular note should be made of the fact that each of the flip flops in the register is an actual storage position, there being no need for buffer or delay stages, and the information bits are shifted directly without any delay in response to the application of a single shift pulse supplied by current source 50. The only limiting parameter as to the pulse supplied by source 50 is that it must be of a certain predetermined magnitude and be maintained for at least the time necessary to cause the flip flops to be switched from one state to the other. There is no limit as to the maximum width of the shift pulses since the current steering circuits coupling the various stages direct the current into one or the other of the two available paths and the current remains in this path until the shift pulse is terminated.

It should also be apparent that superconductor transfer circuits, such as shift registers and ring counters, may be fabricated in accordance with the principles of the subject invention without necessarily employign as storage devices the specific cross coupled flip flops shown in FIG. 1. For example, non cross coupled flip flop circuits of the type shown and described in copending application, Serial No. 774,667, filed November 18, 1958, and assigned to the assignee of the subject invention, may be employed as the storage devices since, with the coupling circuits of the present invention, the shift pulses may be maintained for whatever time is necessary to accomplish the desired shifting without there being any danger of incorrect operation. Likewise, persistent current type storge devices may also be employed, it being only necessary to provide appropriate control and self biasing so that a shift pulse, once applied, is directed through the proper path of the coupling circuit under control of the preceding storage device and remains in that path even though the state of that storage device is thereafter changed before the shift pulse is terminated.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a superconductor circuit; a first and second superconductor bistable storage devices each having a binary one and a binary zero superconductor current path connected in parallel across a current supply means; each of said storage devices being capable of assuming a binary one state in which current from said current supply means is directed through said binary one current path and a binary zero state in which current from said current supply means is directed through said binary zero current path; first and second superconductor current paths connected in parallel across a shift pulse source; first and second superconductor gate conductors respectively connected in said first and second paths; third and fourth superconductor gate conductors respectively connected in said binary zero and binary one current paths of said second storage device; first, second, third, and fourth control conductors respectively arranged in magnetic field applying relationship to said first, second, third and fourth gate conductors; said first and second control conductors being respectively connected in said binary zero and binary one current paths of said first storage device; said third and fourth control conductors being respectively connected in said first and second current paths; each of said paths including said control and gate conductors being maintained at a superconductive temperature; fifth and sixth control conductors respectively connected in said first and second current paths and respectively arranged in magnetic field applying relationship to said first and second gating devices; each of said first and second control conductors being effective when energized by the current from said current supply means to produce in the vicinity of the corresponding one of said first and second gate conductors a field in a first direction and in excess of the critical field for the gate conductor by a predetermined amount; each of said fifth and sixth control conductors being effective when energized by a pulse from said shift pulse source to produce in the vicinity of the corresponding one of said first and second gate conductors a magnetic field in a second direction and less than the critical field for the gate conductor by an amount less than said predetermined amount whereby, when a pulse is applied by said shift pulse source to said parallel connected first and second current paths at a time when said first storage device is in its binary one state, the shift pulse is directed through said first current path including said third control conductor to set said second storage device in its binary one state and remains therein even though said first storage device is thereafter shifted to its binary zero state and, when a shift pulse is applied when said first storage device is in its binary zero state, the shift pulse is directed through said second path including said fourth control conductor to set said second storage device in its binary zero state and remains therein even though said first storage device is thereafter switched from its binary zero to its binary one state.

2. In a superconductor circuit; first and second superconductor bistable storage devices each having a binary one and a binary zero superconductor current path connected in parallel across a current supply means; each of said storage devices being capable of assuming a binary one state in which current from said current supply means is directed through said binary one current path and a binary zero state in which current from said current supply means is directed through said binary zero current path; third and fourth superconductor current paths connected in parallel across a shift pulse source; first and second superconductor gate conductors respectively connected in said third and fourth paths; third and fourth superconductor gate conductors respectively connected in said binary zero and binary one current paths of said second storage device; first, second, third and fourth control conductors respectively arranged in magnetic field applying relationship to said first, second, third and fourth gate conductors; said first and second control conductors being respectively connected in said binary zero and binary one current paths of said first storage device; said third and fourth control conductors being respectively connected in said third and fourth current paths; each of said paths including said control and gate conductors being maintained at a superconductive temperature; said first control conductor being effective when said first storage device is in said binary zero state to generate a magnetic field sufficient to drive said first gate conductor resistive in the absence of a pulse from said shift pulse source in said third path but insufficient to drive said first gate conductor resistive in the presence of a pulse from said shift pulse in said third path; said second control conductor being effective when said second storage device is in said binary zero state to generate a magnetic field sufficient to drive said second gate conductor resistive in the absence of a pulse from said shift pulse source in said fourth path but insufficient to drive said second gate conductor resistive in the presence of a pulse from said shift pulse source in said fourth path; whereby, when a pulse is applied by said shift pulse source to said parallel connected third and fourth current paths at a time when said first storage device is in its binary one state, the shift pulse is directed through said third current path including said third control conductor to set said second storage device in its binary one state and remains therein even though said first storage device is thereafter shifted to its binary zero state and, when a shift pulse is applied when said first storage device is in its binary zero state, the shift pulse is directed through said fourth path including said fourth control conductor to set said second storage device in its binary zero state and remains therein even though said first storage device is thereafter switched from its binary zero to its binary one state.

3. In a superconductor circuit including first and second superconductor storage devices each capable of assuming first and second stable information representing states; a shift pulse source; first and second superconductor paths connected in parallel across said source; each of said paths being coupled to each of said storage devices; each of said storage devices and said paths being maintained at a superconductive temperature; said first path being effective when a shift pulse from said shift pulse source is directed therethrough to set said second storage device in said first stable state; said second path being effective when a shift pulse from said shift pulse source is directed therethrough to set said second storage device in said second stable state; said first storage device when in said second stable state being effective to maintain a portion of said first path resistive in the absence of a shift pulse in said first path; means responsive to said shift pulse for rendering said first storage device ineffective to maintain said portion of said first path resistive in the presence of a shift pulse in said first path; said first storage device when in said first stable state being effective to maintain a portion of said second path resistive in the absence of a shift pulse in said second path; and means responsive to said shift pulse for rendering said first storage device inffective to maintain said portion of said second path resistive in the presence of a shift pulse in said second path.

4. In a superconductor circuit including first and second superconductor storage devices each capable of assuming first and second stable information representing states; a shift pulse source; first and second superconductor paths connected in parallel across said source; said first storage device including control conductor means arranged adjacent to said first and second paths for applying magnetic fields to said first and second paths in accordance with the state of the storage device; said control conductor means being effective when said first storage device is in said second stable state to maintain said first path resistive in the absence of a shift pulse in said first path but ineffective to maintain said first path resistive in the presence of a shift pulse in said first path; said control conductor means being effective when said first storage device is in said first stable state to maintain said second path resistive in the absence of a shift pulse in said second path but ineffective to maintain said second path resistive in the presence of a shift pulse in said second path; and further control conductor means connected in said first and second paths and arranged in magnetic field applying relationship to said second storage device whereby, when a shift pulse is applied by said shift pulse source to said parallel connected first and second current paths at a time when said first storage device is in said first stable state, the shift pulse is directed into said first path to set said second storage device to said first stable state and remains therein even though said first storage device is switched from said first to said second stable state after the shift pulse is applied, and, when a shift pulse is applied by said shift pulse source to said parallel connected first and second current paths at a time when said first storage device is in said second stable state, the shift pulse is directed into said second path to set said second storage device to said second stable state and remains therein even though said first storage device is switched from said second to said first stable state after the shift pulse is applied.

5. In a superconductor information transfer circuit; first, second, and third superconductor storage devices each capable of assuming first and second stable information representing states; a shift pulse source; a first superconductor current steering circuit connected to said shift pulse source and coupling said first and second storage devices for setting said second storage device to one or the other of said stable states in accordance with the state of said first device when a pulse is applied by said shift pulse source; a second superconductor current steering circuit connected to said shift pulse source and coupling said second and third storage devices for setting said third storage device to one or the other of said stable states in accordance with the state of said second device when a pulse is applied by said shift pulse source; means maintaining said storage devices and said steering circuits at a superconductive temperature; each of said steering circuits including first and second current paths connected in parallel with respect to said shift pulse source; each of said paths including self biasing means responsive to a pulse from said shift pulse source in that path; whereby, when a shift pulse is applied simultaneously to each of said steering circuits, the shift pulse is directed into one path of said first steering circuit in accordance with the state of said first storage device and one path of said second steering circuit in accordance with the state of said second storage device and remains in these paths even though either or both of said first and second devices are thereafter switched from one state to the other before said shift pulse is terminated.

6. In an information transfer circuit; a plurality of storage devices each capable of assuming first and second stable information representing states; a plurality of superconductor current steering circuits each coupling a preceding one of said storage devices to a succeeding one of said storage devices; each of said current steering circuits being maintained at a superconductive temperature; and a shift pulse source connected to said current steering circuits for applying thereto pulses effective to transfer information between said devices; each of said steering circuits including first and second superconductor paths which are arranged adjacent each of the storage devices coupled by the steering circuit and are responsive to the state of the preceding one of said devices at the time a shift pulse is initially applied to direct the shift pulse to one or the other of said first and second paths to control the succeeding one of said storage devices; each of said steering circuits including means responsive to a shift pulse applied thereto and directed into one or the other of the paths thereof in accordance with the state of the coupled preceding storage device for rendering the steering circuit non responsive to a change of state effected in the preceding storage device after the shift pulse is initially applied but before it is terminated.

7. In an information transfer circuit; a plurality of storage devices each capable of assuming first and second stable information representing states; a plurality of superconductor current steering circuits each coupling a preceding one of said storage devices to a succeeding one of said storage devices; each of said current steering circuits being maintained at a superconductive temperature; and a shift pulse source connected to said current steering circuits for applying thereto pulses effective to transfer information between said devices; each of said steering circuits including first and second superconductor paths connected in parallel with respect to said shift pulse source and each said path arranged adjacent a portion of the preceding and succeeding storage devices coupled by the steering circuit; each of said storage devices including control conductor means arranged in magnetic field applying relationship to the adjacent portions of the first and second paths of the steering circuit coupling the storage device to the succeeding storage device; the first and second paths of each of said steering circuits being arranged in magnetic field applying relationship to the succeeding one of said storage devices coupled by that steering circuit to a preceding one of said storage devices; each of said first and second paths including self biasing means for rendering that path non responsive to the said control conductor means of the preceding storage device arranged in magnetic field applying relationship thereto once a shift pulse has been established in that path.

8. A superconductor shift register comprising: a plurality of bistable superconductor storage devices each capable of assuming first and second stable information representing states; a plurality of steering circuits each coupling a preceding one of said storage devices to a succeeding one of said storage devices; each of said storage devices and said steering circuits being maintained at a superconductive temperature; a shift pulse source connected to said steering circuits for simultaneously applying a shift pulse to each of said steering circuits and thereby shifting the information stored in each of said storage devices to the succeeding storage devices; each of said storage devices being effective to control the one of said steering circuits which couples it to the succeeding stage in accordance with the state it is in at the time a shift pulse is initially applied to the steering circuit; bias means for rendering each of said steering circuits nonresponsive to a change in state in the preceding storage device after said shift pulse has been applied; whereby, when said shift pulse source is actuated to simultaneously apply a pulse to each of said steering circuits, each steering circuit is initially controlled by the preceding one of the storage devices to set the succeeding one of the storage devices in accordance with the state of the preceding storage device at the time the shift pulse is initially applied and is thereafter non responsive to a change effected in the state of said preceding storage state before the applied shift pulse is terminated.

9. In an information transfer circuit; a plurality of storage devices each capable of assuming first and second stable information representing states; a plurality of superconductor coupling circuits each maintained at a superconductive temperature and each coupling a corresponding preceding one of said storage devices to a corresponding succeeding one of said storage devices; and a shift pulse source for simultaneously applying a shift pulse to each of said coupling circuits each of said coupling circuits including first and second paths; each of said coupling circuits being responsive to the corresponding preceding storage device at the time a shift pulse is initially applied to direct the shift pulse into one or the other of said paths to set the corresponding succeeding storage device in accordance with the state of the corresponding preceding device at the time the shift pulse is initially applied; each said shift pulse when once directed into one or the other of said paths being effective to render said coupling circuit non responsive to any change of state thereafter effective in the preceding storage device before the shift pulse is terminated.

10. In an information transfer circuit of the type including a plurality of storage devices each capable of assuming first and second stable information representing states, a plurality of superconductor coupling circuits each maintained at a superconductive temperature and each coupling a corresponding preceding one of said storage devices to a corresponding succeeding one of said storage devices, and a shift pulse source for simultaneously applying a shift pulse to each of said coupling circuits each of said coupling circuits when a shift pulse is applied thereto being responsive to the state of the corresponding preceding storage device to set the corresponding succeeding storage device in accordance with the state of the corresponding preceding storage device at the time the shift pulse is initially applied; the improvement which comprises the provision of means in each of said coupling circuits responsive to a shift pulse applied thereto for rendering each said coupling circuit non responsive to a change effected in the state of the corresponding preceding storage device after the shift pulse is initially applied and before it is terminated.

References Cited in the file of this patent

UNITED STATES PATENTS

| | | |
|---|---|---|
| 2,832,897 | Buck | Apr. 29, 1958 |
| 2,888,201 | Housman | May 26, 1959 |

UNITED STATES PATENT OFFICE

CERTIFICATE OF CORRECTION

Patent No. 3,019,353 January 30, 1962

James B. Mackay

It is hereby certified that error appears in the above numbered patent requiring correction and that the said Letters Patent should read as corrected below.

Column 1, line 34, for "device" read -- devices --; line 40, for "this is, shift register" read -- that is, shift registers --; column 3, line 16, for "of" read -- or --; column 5, line 6, for "shift" read -- shifted --; column 6, line 51, for "of" read -- for --; column 7, line 65, before "However" strike out the parenthesis; column 8, line 1, for "connection" read -- connecting --; line 33, for "indicatign" read -- indicating --; line 63, for "employign" read -- employing --; line 74, for "storge" read -- storage --; column 12, line 48, for "comprising:" read -- comprising; --.

Signed and sealed this 14th day of August 1962.

(SEAL)
Attest:

ERNEST W. SWIDER
Attesting Officer

DAVID L. LADD
Commissioner of Patents